Feb. 10, 1931.　　W. R. MITTENDORF　　1,792,112
COMPUTING SCALE
Filed Sept. 17, 1923　　3 Sheets-Sheet 1

Fig. 1.

Inventor
WILLIAM R. MITTENDORF

Attorney

Patented Feb. 10, 1931

1,792,112

UNITED STATES PATENT OFFICE

WILLIAM R. MITTENDORF, OF CINCINNATI, OHIO, ASSIGNOR, BY MESNE ASSIGNMENTS, TO INTERNATIONAL BUSINESS MACHINES CORPORATION, OF NEW YORK, N. Y., A CORPORATION OF NEW YORK

COMPUTING SCALE

Application filed September 17, 1923. Serial No. 663,095.

This invention relates to computing scales and one object of the invention is to provide such a scale which will be fully automatic in its action and will require no mechanical manipulation on the part of the operator, thereby avoiding mistakes and saving time and labor.

A further object of the invention is to provide an automatic computing scale which will have the so called standard type of indication, that is, one in which the graduations representing computed values always register in longitudinal alinement with the reading line or indicator, irrespective of the unit of computation.

A further object of the invention is to provide a computing scale which will count any number of parts, in a lot of unknown quantity, within the capacity of the scale, and which may also be used to make up lots of parts of a certain predetermined quantity and of any amount within the capacity of the scale.

A further object of the invention is to provide a computing scale of this type which will count parts of any odd unit of weight within its capacity without changing the leverage of the weighing mechanism which is embodied in the scale.

A further object of the invention is to provide a computing scale of this type in which the computed values are represented by a single series of graduations, the significance of which varies in accordance with the value of the unit of computation.

A further object of the invention is to provide a computing scale of this type which will indicate the number of parts in a lot and the weight of the lot simultaneously.

A further object of the invention is to provide a computing scale of this character which may be utilized either as a counting scale or as a money value computing scale; and in which the same chart may be utilized in making either computation.

Other objects of the invention will appear as the device is described in detail.

In the accompanying drawings

In these drawings I have illustrated one embodiment of my invention and have shown the same as applied to a scale in which the balancing mechanism is of the pendulum type and in which the indicator comprises a rotatable chart which carries the figures past a fixed indicating member but it will be understood that this particular mechanism has been chosen for the purpose of illustration only and that the invention may be applied to scales of various kinds and that the indicating device and the mechanism for operating and controlling the same may take various forms without departing from the spirit of the invention.

Figures 8, 9, 10:
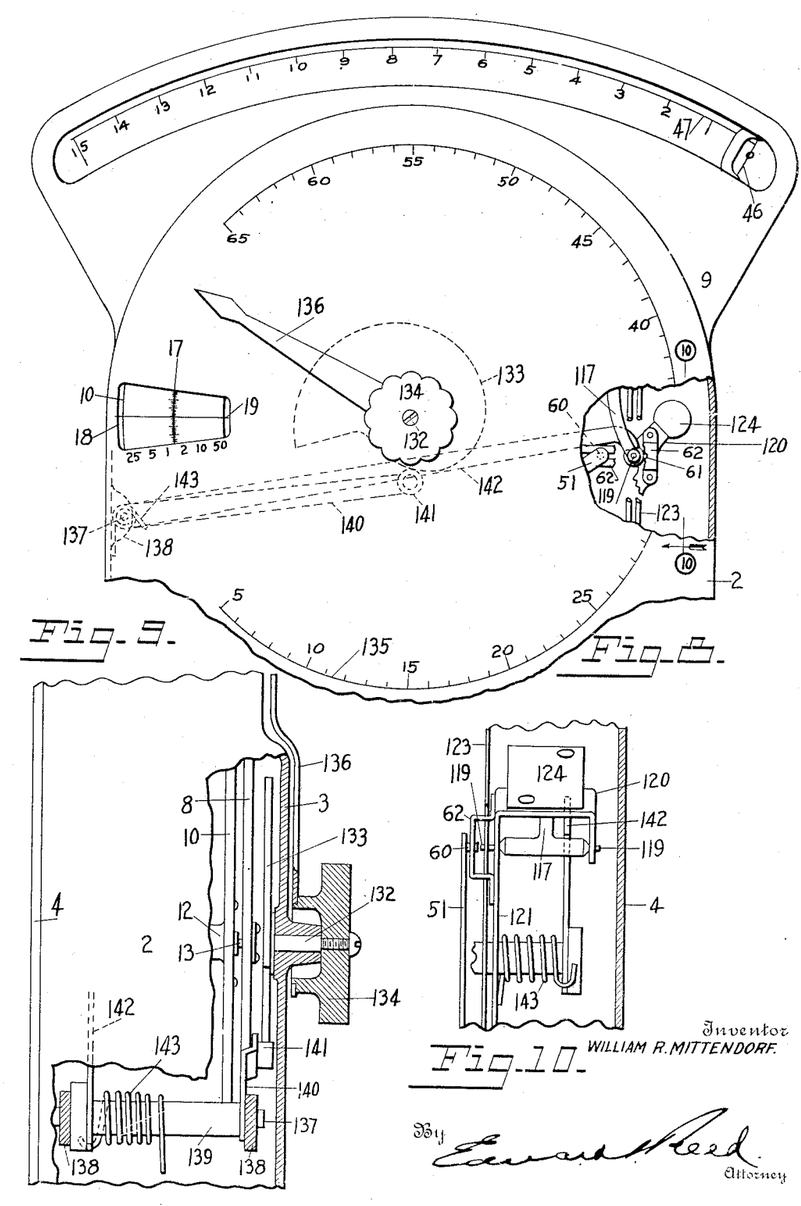
Fig. 8 is a front elevation of the upper portion of the casing, partly broken away, to show the means for causing the scale to compute money values.
Fig. 9 is a sectional detail view of the cam controlled device of Fig. 8.
Fig. 10 is a section taken on the line 10—10 of Fig 8.

The scale here illustrated is designed primarily as a counting scale and is shown as such in Figs. 1 to 7 while in Figs. 8 to 10 I have shown as applied to the counting scale, a mechanism by means of which it may be caused to compute money values, this mechanism being of such a character that when in its idle position it will not interfere with the use of the scale as a counting scale.

In carrying out the invention I have provided an indicating device the movable member of which is actuated by mechanism under the control of a load balance. This mechanism comprises an operating device which will be moved a fixed distance for any given movement of the load balance, this movement being in direct proportion to the movement imparted to the load balance by the load thereon. This operating device is adjustable to vary the rate or speed at which movement is imparted thereby to the indicating member, thereby causing the indicating member to be moved different distances by a given weight on the load balance. When the scale is used as a counting scale the adjustment of the operating device is controlled by a unit of the article to be counted, through the medium of a unit balance. When the scale is to be used for making other computations, such as computing money values, the adjustment of the operating device may be otherwise accomplished, as by means of suitable hand operated mechanism. In the present scale the hand operated mechanism is combined with the unit operated mechanism in such a manner that either may be used independently of the other, but it will be obvious that the scale could be limited in its capacity either to the counting features or to the money value computing features.

Figures 1, 7:
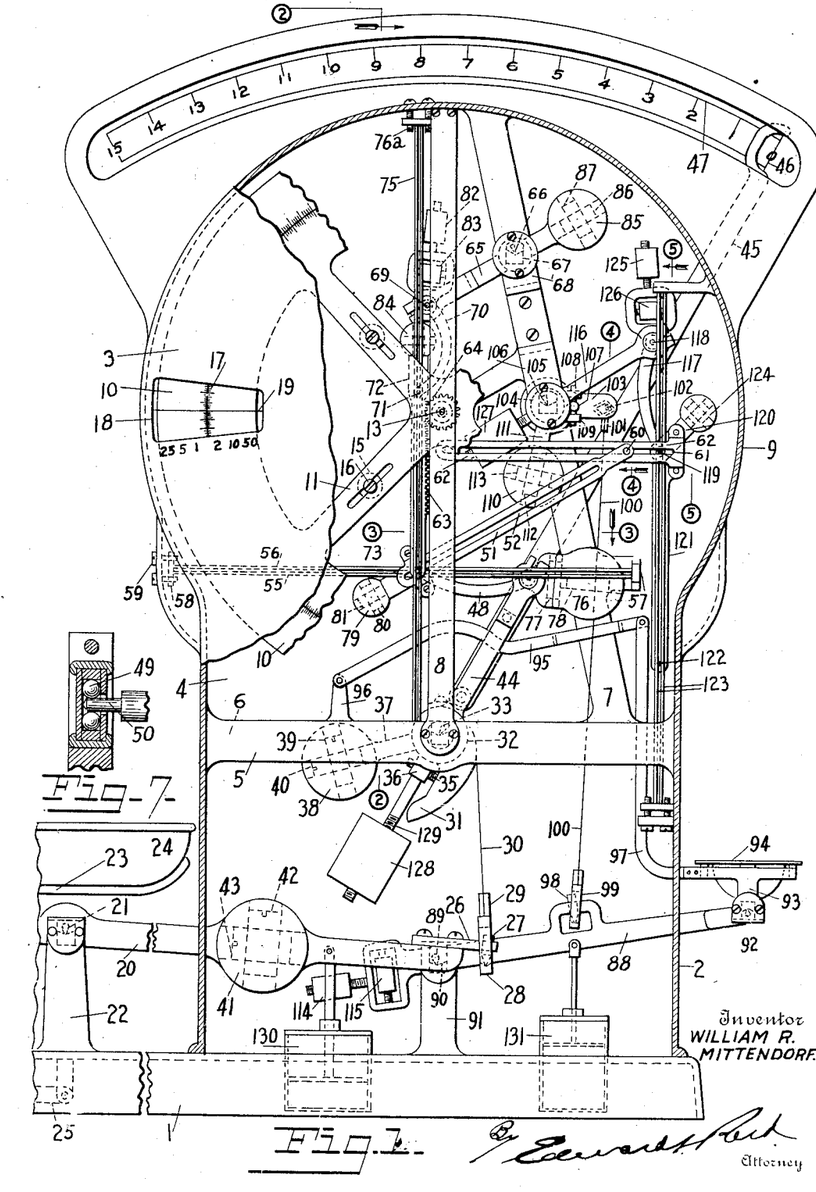
Fig. 1 is a front elevation of a scale embodying my invention, partly broken away to show the mechanism within the casing.
Fig. 7 is a detail view of one of the bearings.
Figure 2:
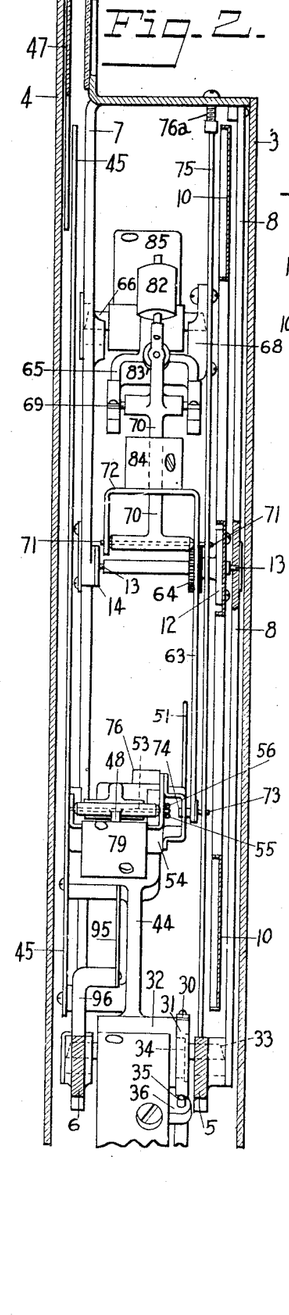
Fig. 2 is a section taken on the line 2—2 of Fig. 1.
Figure 3:
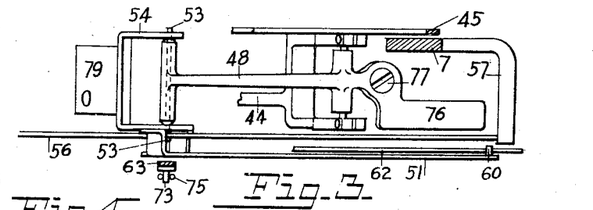
Fig. 3 is a section taken on the line 3—3 of Fig. 1.
Figures 4, 5, 6:
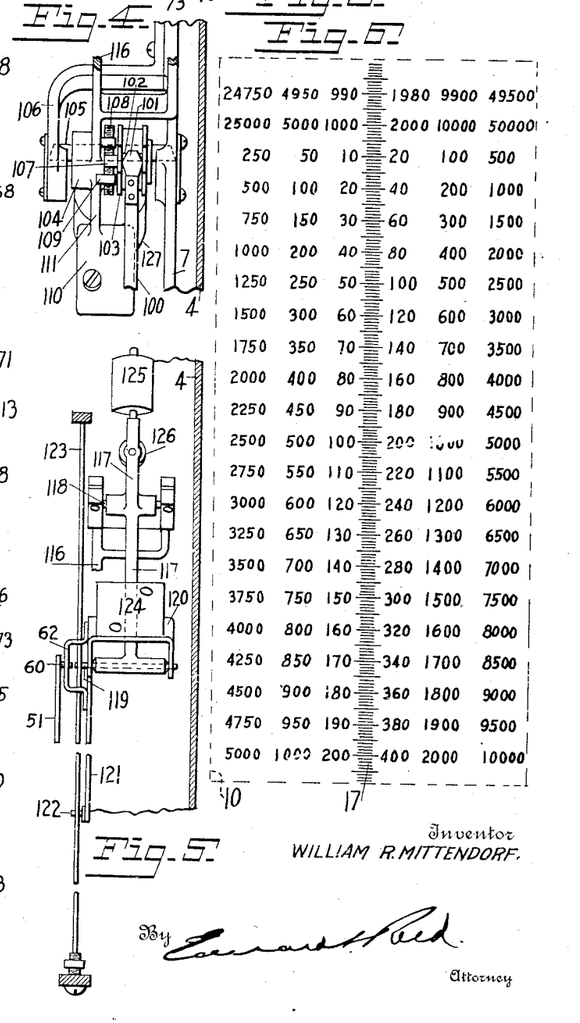
Fig. 4 is a section taken on the line 4—4 of Fig. 1.
Fig. 5 is a section taken on the line 5—5 of Fig. 1.
Fig. 6 is a straight line lay-out of a portion of the rotatable computing chart.

In that particular embodiment of the invention here illustrated the scale comprises a base 1 on which is mounted an upwardly extending housing 2 having a front wall 3 and a back wall 4. Extending transversely of the housing are horizontal bars 5 and 6 which are rigidly secured at their ends to the side walls of the housing and are arranged parallel one with the other adjacent respectively to the front and rear walls of the housing. An upright bar 7 extends from the rear horizontal bar 6 to the top wall of the housing and a second upright bar 8 extends from the transverse bar 5 to the top wall of the housing. The housing itself and these several bars constitute the frame upon which various parts of the mechanism are mounted. In the present form of the mechanism the upper portion of the housing is substantially cylindrical in contour, as shown at 9, and has mounted therein a rotatable computing chart. It is desirable that this chart should be of a very light weight and should be mounted for free rotatory movement, with its center of gravity established at the axis thereof. I have therefore shown the chart as comprising an annular flat portion or band 10 which is supported by a spider 11 which in turn is rigidly secured to a flanged hub 12 rigidly mounted on a shaft 13, this shaft being journaled at its front end in a suitable bearing in the upright bar 8 and at its rear end in a suitable bearing in a bracket 14 projecting from the upright bar 7. It is desirable that the center of gravity of the rotatable chart should be established at the axis thereof and for this purpose the arms of the spider are slotted and small weights 15 are mounted in these slots for radial adjustment along the respective arms, the weights being secured in their adjusted positions by means of screws 16. The annular portion 10 of the rotatable chart is provided with a single series of graduations, which, as shown at 17, is arranged circumferentially of the chart. Associated with this single series of graduations are a plurality of series or columns of figures, the corresponding figures of each column being associated with the same graduation in the series 17 and each of said figures representing a different value for said graduation, which value is determined by the unit of value upon which the computation is being based. In the counting operation this unit of value comprises one or more of the parts to be counted and, as here shown, the front wall or face plate of the scale is provided adjacent to the edge of the reading opening 18 with a series of numbers arranged adjacent to the respective columns of figures on the chart, each of these numbers representing the value of the unit of computation of the corresponding column of figures. The computations of the column numbered "1" are based on a unit consisting of one part and the graduations are numbered from 1 to 1000. In the column numbered "50" they are based on a unit consisting of fifty parts and the graduations are numbered from 50 to 50,000, each graduation representing fifty parts. The reading opening is provided with a suitable fixed indicator which is preferably in the form of a fine wire 19 extending transversely to the annular portion of the chart so as to register successively with the several graduations.

As has been stated operative movement is imparted to the movable indicating member by mechanism controlled by the load balance. In the present instance, this operating mechanism is of the reverse pendulum type, that is, the pendulum is held normally in an elevated position at zero and moves downwardly from its zero position in proportion to the weight of the load applied to the load balance, but it will be understood that the mechanism may take any suitable form. As here shown, the load balance, or load operated weighing mechanism, comprises a lever 20 pivotally mounted between its ends, by means of knife edge pivots 21, on upright standards 22 carried by the base 1. As here shown, this lever is of the first principle but obviously it may be of any suitable type. At the outer or shorter end of the lever is pivotally mounted a carrier 23 which in turn supports the load receptacle or platform 24. The carrier is retained in its proper position by the usual check link mechanism, as shown at 25. The inner or longer end of the lever 20 is provided with a nose iron 26 which carries a needle point 27 which in turn engages a bearing in the cross bar 28 of a stirrup 29. This stirrup is rigidly secured to one end of a flexible tape or ribbon 30 the other end of which is secured to a cam 31. This cam is adjustably mounted on a hub member 32 which is supported by knife edged pivots 33 in suitable V bearings carried by the cross bars 5 and 6. The adjustable connection between the cam and the hub may take various forms but, as here shown, the cam is rotatably mounted upon a reduced end portion of the hub, as shown at 34, and its movement relative to the hub is controlled by a screw 35 mounted in a lug 36 carried by the hub and arranged in the path of the inner edge of the cam, which is held in contact with the screw by the tension on the ribbon 30. Rigidly connected with the hub is a pendulum and, in the present instance, this pendulum consists of an arm 37 formed integral with the hub 32 and having an enlarged or weighted end portion 38. This pendulum weight has mounted therein two screw plugs 39 and 40 which are adjustable respectively lengthwise of the pendulum arm and transversely thereto so as to establish the required power in the pendulum both radially and circumferentially thereof. Inasmuch as the pendulum 38 is of the reverse type it is necessary that the main lever 20 of the load balance shall be provided, on that side of the fulcrum opposite the platform, with sufficient weight to counterbalance the load to be weighed and the reverse pendulum. In the present construction, this is accomplished by providing the lever with an enlarged portion 41 of sufficient size to provide the necessary weight. In order that the lever may be sealed, or the weight adjusted, to give the required power to the weighted end thereof the enlarged section of the lever is provided with two screw plugs 42 and 43 which are adjustable lengthwise of the lever and transversely thereof, respectively. It will be apparent, therefore, that when a load is placed on the load platform 24 the inner end of the lever 20 will move upwardly a distance proportionate to the weight of the load, thereby permitting the pendulum 38 to move downwardly to rock the hub 32 about its axis. Rigidly secured to the hub 32 is an arm 44 to which is attached a weight indicating arm 45 which extends beyond the periphery of the circumferential portion 9 of the housing and is provided with an indicating portion or wire 46 which travels over a series of weight graduations 47, thereby indicating the weight of the load which has been placed on the load platform. It is possible to so indicate the weight of the load because the movement of the arm 44, and consequently of the indicator 45, is always the same for a given movement of the lever 20 of the load balance and therefore is always the same for a given weight on the load platform. Pivotally mounted on the outer end of the arm 44 is a lever 48. This lever may be mounted on the arm 44 in any suitable manner but, as here shown, the arm 44 has its outer end bifurcated or fork shaped and each arm of the bifurcation has mounted therein ball bearings, as shown at 49 in Fig. 7. Journaled in these ball bearings is a shaft 50 to which the lever 48 is rigidly secured. Pivotally connected with the free end of the lever 48 is an operating device here shown in the form of an arm 51 having a longitudinal slot 52. This arm may be connected with the lever in any suitable manner but, in the present instance, a shaft 53 is rigidly mounted in the end of the lever 48 and has its ends projecting beyond the adjacent portions of the lever to receive the arms of a yoke shaped member 54 to which the operating device or arm 51 is rigidly secured, and in this manner the arm 51 is pivotally mounted on the lever 48. One end of the shaft 53, which supports the arm 51 extends into a guideway formed between two parallel wires 55 and 56 which are supported at one end in a bracket 57 carried by the upright bar 7 and are mounted at their other ends in a plate 58 which is mounted upon and adjustably supported by two screws 59 extending through the side wall of the housing, whereby the wires may be drawn taut and a perfectly straight guideway provided for the shaft 53, thus causing one end of the lever 48 to travel in a straight line while the other end is carried in the arc of the circle described by the end portion of the arm 44. The other end of the arm 51 is also guided in a straight line parallel with the line of movement of the shaft 53. As here shown, the upper end of the operating member 51 is provided with a transverse projection or pin 60 which travels in a guideway 61 formed in an elongated plate or bar 62 which is supported in a normally fixed position parallel with the guideway for the shaft 53. The guide member 62 is adjustable, in a manner which will be hereinafter described, toward and from the guideway for the shaft 53 but is maintained at all times in parallelism therewith so that the two ends of the operating member 51 will travel in parallel lines, thereby maintaining the operating member at a fixed angle to the respective guideways.

Operating movement is imparted by the operating member 51 to the movable indicating member through suitable actuating devices which, as here shown, comprise a toothed bar or rack 63 which meshes with a pinion 64 rigidly secured to the hub 12 which carries the rotatable indicating member. The rack bar is guided in a straight line and is supported in such a manner that there will be little or no frictional contact between the same and the guides therefor. As here shown, the supporting devices for the rack bar comprise an arm 65 having knife edge pivot pins 66 mounted in bearings 67 carried, respectively, by the upright bar 7 and by a bracket 68 rigidly secured to that bar. The free end of the arm 65 is bifurcated and the ends of the bifurcation are provided with bearings, preferably roller bearings, in which is mounted a shaft 69 having rigidly secured thereto one end of a lever 70 the other end of which has rigidly mounted therein a shaft 71 on the end portions of which are mounted the arms of a yoke 72 to which the rack bar 63 is rigidly secured. In the present instance, one arm of the yoke shaped member 72 is extended downwardly to form the rack bar. The rack bar 63 is provided at its lower end with oppositely extending projections or pins 73 and 74. The pin 74 extends into the slot 52 in the operating member 51, while the pin 73, and also the end of the shaft 70 at the upper end of rack bar, are mounted in the guideway formed between two vertically arranged parallel wires 75 which are connected at their lower ends with the cross bar 5 and are adjustably supported at their upper ends by screws 76a in the same manner that the wires 55 and 56 are supported. It will be understood that in each instance the guideways are of a width slightly greater than the thickness of the pin or lug which travels therein thus enabling the pin or lug to be supported in an intermediate position in which it will be out of contact with both walls of the guideway. The mechanism is so balanced and arranged that the centers of gravity of the several parts thereof will be established at the axes of the respective parts, thereby eliminating, or reducing to a minimum, the frictional contact between the parts and the walls of the respective guideways. As here shown, the lever 48 is provided with an enlarged end portion 76 having radial and transverse screw plugs 77 and 78 by means of which the weight may be so adjusted as to establish the center of gravity of the lever 48 and the parts carried thereby at the axis of the lever 48. The yoke 54 which carries the operating member or arm 51 is also provided with a weight 79 which tends to counterbalance the end of the operating arm and which is provided with screw plugs 80 and 81 by means of which the center of gravity of the arm and its associated parts may be established at the axis thereof. Thus in both instances the frictional contact between the movable parts and their guideways is eliminated. In order that the arm 44 and the various parts attached to or carried by it may be counterbalanced around the pivot 33 and thus give the pendulum weight 38 independent control over the main lever 20, I have provided the hub structure 32 with a balance weight 128 which is adjustably mounted on a screw threaded rod 129 carried by the hub member. The lever 70 which supports the rack arm 63 is also provided with longitudinally and transversely adjustable weights 82 and 83 by means of which the center of gravity of the lever 70 may be established at the axis thereof and the shaft 71 supported out of frictional engagement with the guide wires 75. Likewise the yoke shaped member 72 which carries the rack bar is provided with a weight 84 having longitudinally and transversely adjustable plugs to enable the center of gravity of the rack bar and its associated parts to be established at the axis thereof, thus supporting the pin 73 out of frictional contact with the guide wires 75. The arm 65 is provided with a weight 85 to counterbalance the arm and the several parts carried thereby and this arm is also provided with longitudinally and transversely adjustable screw plugs 86 and 87 whereby the center of gravity of the whole assembly may be established at the axis of the arm 65 and in this manner the dead weight of the actuating device and its associated parts is neutralized and it will be apparent that the several parts of the connecting mechanism which is interposed between the load controlled arm 44 and the rotatable chart, are free to move relatively one to the other with practically no frictional contact and consequently little or no resistance will be offered to the movement of the parts. As has been heretofore pointed out the operating member or arm 51 is moved in a fixed path by the arm 44 as the latter is moved under the control of the load and the amount of this movement will always be the same for a given load on the load platform. The operating member acts on the rack bar through the medium of the pin or projection 74, with a cam like action which will impart longitudinal movement to the rack bar and will cause the chart to be rotated. By adjusting the angular relation of the cam like operating member to its fixed path of travel the rate at which the rack bar is moved may be varied, that is, by arranging the operating member at a greater inclination to the wires 55 and 56 the same amount of movement imparted to the operating member will cause the rack 63 to be moved a greater distance because it is moved at a higher speed during the same length of time. It will be noted that in this manner the indicating device is operated by the load controlled mechanism but the rate of the operation may be controlled according to a unit of computation to vary the amount of movement imparted to the indicating device and thereby vary the result of the computation.

The operating member may be adjusted to alter the rate at which the indicating device is operated in various ways but, as has been stated, when the scale is used for counting purposes this is preferably accomplished by means of a unit balance, this unit balance being connected with the adjustable guide 62 in such a manner as to cause vertical movement to be imparted thereto. As shown in the present drawings the unit balance comprises a main lever 88 supported between its ends by knife edge pivots 89 which engage bearings 90 carried by upright standards 91 mounted on the base 1. In the present machine the lever 88 is shown as a lever of the second principle but it will be understood that it may be of any suitable type. At its outer end the lever 88 is provided with knife edge pivots 92 on which is supported a carrier 93 in which is mounted a unit receptacle 94. The carrier 93 is maintained in its upright position by means of a check link 95 connected at one end with an arm 96 carried by the cross bar 6 and connected at its other end with a stem 97 rigidly secured to the carrier 93. At a point between the pivot pins 92 and 89 the lever 88 is provided with a needle point 98 which engages a bearing in the cross bar of a stirrup 99 which is rigidly secured to a flexible tape or ribbon 100. The upper end of the ribbon 100 is secured to a stirrup 101 having a V bearing to engage a pivot pin 102 carried by an arm 103 which is adjustably connected with a hub member 104, which is provided at its ends with knife edge pivots 105 to engage V bearings carried by the upright bar 7 and by a bracket 106 rigidly secured to that bar and, in the present instance, formed integral with the bracket 68. The arm 103 is rigidly connected with the hub member 104 but the connection is such that the relative position of the arm may be varied. To this end I have provided the arm with a laterally extending projection 107 which is arranged between the adjacent ends of screws 108 carried by lugs 109 secured to the hub member 104. The hub member 104 is provided with a pendulum 110 which, in the present instance, is connected at the hub by an arm 111, the weight, arm and hub being formed integral. The pendulum weight has mounted therein a longitudinally extending screw plug 112 and a transversely extending screw plug 113 by means of which the required power will be established in the pendulum. This pendulum being of the direct type, that is, the power of the pendulum being directly opposed to the load in the unit receptacle, the pendulum normally occupies a position near the plumb line through its axis and it rises as the load is applied to the unit receptacle. As a result the lever 88 of the unit balance must exert a certain initial tension on the ribbon 100 when there is no load in the unit receptacle. This may be accomplished by counterbalancing the lever 88 on that side of its fulcrum opposite the unit receptacle and, as here shown, the inner or shorter end of the lever is provided with a longitudinally adjustable weight 114 and a transversely adjustable weight 115 by means of which the lever may be sealed to give the required tension on the ribbon. It will be apparent, however, that, if desired, the mechanism may be so arranged that the counterbalancing action will be that of a reverse pendulum, which descends as the load is applied to the unit receptacle. Rigidly secured to the hub member 104 is an arm 116 at the outer end of which is pivotally supported a lever 117, and, in the present construction, the outer end of the arm 116 is bifurcated and the two parts thereof are provided with ball bearings in which is mounted a shaft 118 to which the lever 117 is rigidly secured. In the lower end of the arm 117 is mounted a shaft 119 on the ends of which are pivotally mounted the two arms of a yoke shaped member 120. Rigidly secured to this yoke shaped member is the guide 62 for the upper end of the operating member 51. Also rigidly secured to the yoke shaped member 120 and extending downwardly therefrom is an arm 121 having at its lower end a lateral projection or pin 122. This pin 122 and the shaft 119 both project into the space between two guide wires 123 which are mounted in parallel positions and held taut in the manner heretofore described to provide a straight guideway for the pin and shaft. The yoke shaped member 120 is provided with a counterbalancing weight 124 having screw threaded plugs by means of which the weight thereof may be adjusted to establish the center of gravity of the yoke shaped member at the axis thereof, thus eliminating frictional contact between the pin 122 and the guide wires 123, which guide wires thus serve to maintain the guide bar 62 in a true horizontal position in all positions of the yoke shaped member 120 without offering any frictional resistance to the movement thereof. The lever 117 is counterbalanced by weights 125 and 126 and these may be adjusted to establish the center of gravity of the lever and the parts carried thereby at the axis of the lever, thereby eliminating frictional contact between the ends of the shaft 119 and the guide wires 123. The hub member 104 is provided with an adjustable weight 127 which serves to counterbalance the weight of the arm 116 and its associated parts so as to give the pendulum weight 110 independent control over the weight of the unit in the unit receptacle.

It will be apparent therefore that in the counting operation a unit consisting of one or more of the parts to be counted is placed in the unit receptacle 94 and the unit balance acting through the connecting mechanism will shift the guide arm 62 to a position corresponding to the weight of the unit and this movement of the guide arm will change the angular position of the operating member 51 with relation to its line of movement and will thereby vary the rate at which the indicator is actuated under the control of the load balance as has been above described.

The load balance mechanism and the unit balance mechanism are preferably provided with means for controlling and arresting the vibrations thereof, this being accomplished by providing the levers 20 and 88, respectively, with the usual dash pot control, as shown at 130 and 131.

When it is desired to utilize the scale for computing money values it may be provided with manually operated means for adjusting the position of the cam like operating member with relation to its path of travel. In the present instance I have provided means which may be utilized for this purpose but which will not, when in its idle position, interfere with the use of the scale as a counting scale, and I have thereby provided a scale which at the will of the operator may be used for counting parts by weight or for computing values based on a selected unit of computation, such as a price per pound. This mechanism is shown in Figs. 8, 9 and 10, in which I have shown a short shaft 132 journaled in a bearing in the front wall 3 of the housing and having rigidly secured to its inner end a cam 133 and having secured to its outer end a knob or operating handle 134 by means of which the cam may be adjusted. The front wall or face plate of the scale is provided with an annular series of graduations, as shown at 135, which represent the price per pound, the scale being in the present instance graduated in units of one cent each. Rigidly secured to the knob 134 is a pointer 136 which travels over the series of graduations to indicate to the operator the position of the cam 133 and therefore the position of the operating member which is controlled by that cam. A shaft 137 is mounted in lugs 138 at one side of the housing 2 and has mounted thereon a hub or sleeve member 139 to one end of which is rigidly secured an arm 140 which extends inwardly to a position beneath the shaft 132 and is provided with a projection or roller 141 arranged to be engaged by the cam. Rigidly secured to the opposite end of the hub or sleeve 139 is a second lever 142 the free end of which is arranged above and in a position to engage the end portion of the lever 117. A spring 143 acts on the hub member 139 to hold the arms normally in their elevated positions, thus maintaining the projection 141 in contact with the cam and tending to elevate the arm 142 as the cam is returned to its zero position. It will be apparent that when the cam 133 is rotated to depress the arm 142 this arm will carry with it the lever 117 thus shifting the position of the guide bar 62, the amount of movement imparted to the guide bar being determined in accordance with the units of computation as represented by the graduations 135. When the guide bar 62 has been adjusted to position the operating member according to the unit of computation the weight is placed upon the load platform and the computation is effected as has been above described. When the computation is completed the cam 133 is returned to its zero position and the lever 117 is thereby released so that the same is again free to operate under the influence of the unit balance. The computation may be effected on the same chart that is used in counting parts, it being only necessary to provide this chart with a series of money value graduations upon which the computed price, at the selected price per pound, may be read, or, in the chart here shown the number "1" column of figures may be used for money calculations, as each graduation represents one unit, or one cent. While I have described the money value computing device as a part of the counting scale it will of course be obvious that if it is desired to build the scale for money value computations only the unit balance and its associated parts may be eliminated and the operating member manually adjusted in a manner similar to that above described or in any other suitable manner. The graduations on the front wall of the housing, which have been above characterized as price per pound graduations, may also be utilized as index numbers when the scale is used for counting purposes. When parts of a given kind are counted at frequent intervals it may be desirable to ascertain the position of the operating member for computing the number of articles of that kind and then adjust the operating member manually rather than by the use of the unit balance. This can readily be done by means of these index number graduations. To determine the particular index number which will apply to a given article a unit of such articles would be placed in the unit receptacle, thus adjusting the operating member accordingly. A mass of similar articles would then be placed on the load platform and the indicating chart 10 actuated to effect a computation. After the dial has come to rest, and in order to determine the index number, the knob 134 is actuated to cause the cam 133 to depress the arm 142 into engagement with the end of the lever 117. The arm should just touch the lever without imparting appreciable movement to it, consequently the cam should be carefully adjusted until there is the slightest perceptible movement of the chart. The graduation then indicated by the pointer 132 on the series of graduations 135 will be the index number for that particular unit. This index number having been once established for a certain part it will only be necessary on subsequent counting operations for parts of that particular kind to set the pointer 136 to this index number.

The operation of the scale will be readily understood from the foregoing description of the several parts thereof and it will be apparent that when a lot or mass of articles are to be counted the mass is placed upon the load platform 24 and the weight thereof is counterbalanced by the weighted end of the lever 20, thereby reducing proportionately the tension on the ribbon 30 and permitting the pendulum 38 to descend until a position of equilibrium is obtained. When the parts of the load mechanism are thus actuated the arm 44 will be moved to the left, in Fig. 1, a distance proportionate to the weight of the load, and the arm will carry the shaft 53 in a straight line a proportionate distance. Consequently the operating arm 51 is also proportionately moved to the left in a straight line and in this movement of the arm the wall of the slot 52 will actuate the indicating mechanism through the stud or pin 74 at a rate of movement proportionate to the angular position of the operating arm 52 with relation to the line of movement of the arm. This angular position of the operating arm is established by the position of the parts comprising the unit balance mechanism, as determined by the weight of the unit in the unit receptacle 94. In other words the placing of a unit in the unit receptacle actuates the parts comprising the unit balance mechanism until equilibrium is obtained, whereupon the operating arm 51 has assumed an angular position significant of the weight of the unit, and this angular position of the operating arm is maintained by said unit during the operative movement of the operating arm by the load balance mechanism, with the result that the indicating mechanism is given a movement proportionate to the straight line movement of the operating arm and the angular position of that arm. Consequently the significance of the graduations 17 on the chart change according to the value of the unit in the unit receptacle. If this unit comprises a single part then each graduation represents one part; if the unit which is placed in the unit receptacle consists of ten parts then each graduation represents ten parts. To ascertain the correct computation it is only necessary to read the indications in that column of figures corresponding to the number of articles in the unit, as represented by the indicating numbers adjacent to the reading opening.

While I have shown and described one embodiment of my invention I wish it to be understood that I do not desire to be limited to the details thereof as various modifications may appear to a person skilled in the art.

Having now fully described my invention, what I claim as new and desire to secure by Letters Patent, is:

1. In a scale, cooperating indicating members, an actuating device for one of said indicating members, means for neutralizing the dead weight of said actuating device, and an operating member for said actuating device, said operating member being capable of two movements, one of said movements being adapted to impart movement to said actuating device and the other of said movements being adapted to vary the amount of movement imparted to said actuating device by the first mentioned movement of said operating member.

2. In a scale, cooperating indicating members, an actuating device for one of said indicating members, means for neutralizing the dead weight of said actuating device, and a cam like member arranged to operatively engage said actuating device and capable of two movements, one of said movements being adapted to impart operative movement to said actuating device and the other of said movements being adapted to vary the amount of movement imparted to said actuating device by the first mentioned movement of said member.

3. In a scale, cooperating indicating members, an actuating device for one of said indicating members, means for neutralizing the dead weight of said actuating device, an operating member for said actuating device, said operating member being capable of two movements, one of said movements being adapted to impart movement to said actuating device and the other of said movements being adapted to vary the amount of movement imparted to said actuating device by the first mentioned movement of said operating member, load controlled means to impart the first mentioned movement to said operating member, and means actuated according to a unit of computation to impart the last mentioned movement to said actuating member.

4. In a scale, cooperating indicating members, an actuating device for one of said indicating members, means for neutralizing the dead weight of said actuating device, an operating member movable in a fixed path with relation to said actuating device and having a part extending at an acute angle to the line of movement thereof and arranged to operatively engage said actuating device, means to vary the angular position of said part, and load controlled means to impart operative movement to said operating member.

5. In a scale, cooperating indicating members, an actuating device for one of said indicating members, means for neutralizing the dead weight of said actuating device, an operating member movable in a fixed path with relation to said actuating device and having a part extending at an acute angle to the line of movement thereof and arranged to operatively engage said actuating device, means actuated according to a unit of computation to vary the angular position of said part, and load controlled means to impart operative movement to said operating member.

6. In a scale, cooperating indicating members, an actuating device for one of said indicating members, an operating member movable in a fixed path with relation to said actuating device, and having a part extending at an acute angle to the line of movement thereof and arranged to operatively engage said actuating device, normally stationary guides for the respective ends of said operating member, means to adjust one of said guides with relation to the other to vary the angular position of said operating member with relation thereto, and load controlled means to move said operating member along said guides.

7. In a scale, cooperating indicating members, an actuating device for one of said indicating members, an operating member movable in a fixed path with relation to said actuating device, and having a part extending at an acute angle to the line of movement thereof and arranged to operatively engage said actuating device, parallel guides for the respective ends of said operating member, one of said guides being adjustable toward and from the other according to a unit of computation to vary the angular position of said operating member with relation to its path of travel, and load controlled means for moving said operating member along said guides.

8. In a scale, cooperating indicating members, an actuating device for one of said indicating members, an operating member movable in a fixed path with relation to said actuating device, and having a part extending at an acute angle to the line of movement thereof and arranged to operatively engage said actuating device, parallel guides for the respective ends of said operating member, means actuated according to a unit of computation for adjusting one of said guides with relation to the other to vary the angular position of said operating member with relation to its path of travel, and load controlled means for imparting operative movement to said operating member.

9. In a scale, cooperating indicating members, an actuating device for one of said indicating members, guides arranged in permanent parallelism, an elongated operating member having near its respective ends parts adapted to travel in said guides, said operating member having a part arranged at an acute angle to the length of said guides and adapted to engage said actuating device and impart movement thereto, and means for moving one of said guides toward or from the other to vary the rate at which said movement is imparted to said actuating device, and load controlled means to impart movement to said operating member.

10. In a scale, cooperating indicating members, an actuating device for one of said indicating members mounted for movement in a straight line, means for neutralizing the dead weight of said actuating device, an operating member mounted for movement in a straight line intersecting the line of movement of said actuating device and having a part arranged at an acute angle to its line of movement and adapted to operatively engage said actuating device, adjustable means for varying the angular position of said operating member with relation to its line of movement, and load controlled means for imparting operative movement to said operating member.

11. In a scale, cooperating indicating members, an actuating device for one of said indicating members comprising a part movable in a straight line, means for neutralizing the dead weight of said actuating device, an operating member movable in a fixed path intersecting the line of movement of said part of said actuating device, said operating member having a part arranged to engage said part of said actuating device with a cam action, load controlled means for imparting operative movement to said operating member, and means controlled in accordance with a unit of computation to vary the position of said operating member with relation to its path of movement to determine the rate of movement of said actuating device relative to the movement of said operating member.

12. In a scale, cooperating indicating members, an actuating device for one of said indicating members comprising a part movable in a straight line, an operating member movable in a fixed path intersecting the line of movement of said part of said actuating device, said operating member having a part arranged to engage said part of said actuating device with a cam action, load controlled means for imparting operative movement to said operating member, a movable unit receptacle, and means controlled by said unit receptacle to vary the position of said operating member with relation to its line of movement.

13. In a scale, cooperating indicating members, an actuating device for one of said members having a part movable in a fixed path, means for neutralizing the dead weight of said actuating device, an operating member arranged to engage a part of said actuating device with a cam action, means to cause said operating member to travel in a fixed path, load controlled means to impart operative movement to said operating member, and means to adjust said operating member with relation to its line of movement to vary its action on said actuating device.

14. In a scale, cooperating indicating members, an actuating device for one of said members having a part movable in a fixed path, an operating member arranged to engage a part of said actuating device with a cam action, means to cause said operating member to travel in a fixed path, load controlled means to impart operative movement to said operating member, and means actuated according to a unit of computation to adjust said operating member with relation to its line of movement to vary its action on said actuating device.

15. In a scale, cooperating indicating members, an actuating device for one of said members having a part movable in a fixed path, means for neutralizing the dead weight of said actuating device, an operating member arranged to engage a part of said actuating device with a cam action, means to cause said operating member to travel in a fixed path, load controlled means to impart operative movement to said operating member, and manually operated means to adjust said operating member with relation to its line of movement to vary its action on said actuating device.

16. In a scale, cooperating indicating members an actuating device for one of said members having a part movable in a fixed path, an operating member arranged to engage a part of said actuating device with a cam action, means to cause said operating member to travel in a fixed path, load controlled means to impart operative movement to said operating member, manually operated means to adjust said operating member with relation to its line of movement to vary its action on said actuating device, and automatically controlled means operable independently of said manually operated means to adjust said operating member with relation to its line of movement.

17. In a scale, cooperating indicating members, an actuating device for one of said members having a part movable in a fixed path, an operating member arranged to engage said part of said actuating device with a cam action, a pivoted structure connected with said operating member to impart operative movement thereto, means to cause said operating member to travel in a fixed path, a load actuated member, an operative connection between said load actuated member and said structure, and means to adjust said operating member with relation to its line of movement to vary its action on said actuating device.

18. In a scale, cooperating indicating members, an actuating device for one of said members having a part movable in a fixed path, an operating member arranged to engage said part of said operating device with a cam action, a structure pivotally mounted on a fixed axis, a lever mounted on said structure and having its free end operatively connected with said operating member, means to guide said operating member in a straight line, a load actuated member operatively connected with said pivoted structure, and means to adjust said operating member with relation to its line of movement to vary its action on said actuating device.

19. In a scale, cooperating indicating members, an actuating device for one of said members having a part movable in a fixed path, a structure pivotally mounted on a fixed axis, a load actuated member operatively connected with said structure, a lever pivotally mounted on said structure, an operating device mounted on the free end of said lever and arranged to engage said actuating device with a cam action, means to guide the free end of said lever in a straight line, means to establish the center of gravity of said lever at the axis thereof to relieve the friction between said lever and said guide, and means to adjust said operating device with relation to its line of movement to vary its action on said actuating device.

20. In a scale, cooperating indicating members, an actuating device for one of said members having a part movable in a fixed path, a structure pivotally mounted on a fixed axis, a load actuated member operatively connected with said structure, a lever pivotally mounted on said structure, an operating device pivotally mounted on the free end of said lever, means for establishing the center of gravity of said operating device at the axis of its connection with said lever, means to guide the free end of said lever in a straight line, means to establish the center of gravity of said lever at the axis thereof, and means to adjust said operating member with relation to its line of movement to vary its action on said actuating device.

21. In a scale, cooperating indicating members, an actuating device for one of said members having a part movable in a fixed path, a hub structure pivotally mounted on a fixed axis, a cam carried by said hub structure, a load actuated member, a flexible member connecting said load actuated member with said cam, a pendulum connected with said hub structure, an arm rigidly secured to said hub structure, a lever pivotally mounted on said arm, an operating member carried by said lever and arranged to engage said part of said actuating device with a cam action, means to guide said operating member in a fixed path, and means to adjust the position of said operating member with relation to its path of movement to vary its action on said actuating device.

22. In a scale, cooperating indicating members, an actuating device for one of said members having a part movable in a fixed path, a hub structure pivotally mounted on a fixed axis, a cam carried by said hub structure, a load actuated member, a flexible member connecting said load actuated member with said cam, a pendulum connected with said hub structure, an arm rigidly secured to said hub structure, a lever pivotally mounted on said arm, a device arranged adjacent to said lever and having a longitudinal guideway, a part carried by said lever and extending into said guideway, an operating member pivotally mounted on the free end of said lever, a second device having a longitudinal guideway arranged parallel with the first mentioned guideway, said operating member having a part extending into the last mentioned guideway, and means to adjust the device having the last mentioned guideway to vary the position of said operating member with relation to its line of movement.

23. In a scale, cooperating indicating members, an actuating device for one of said members having a part movable in a fixed path, a hub structure pivotally mounted on a fixed axis, a cam carried by said hub structure, a load actuated member, a flexible member connecting said load actuated member with said cam, a pendulum connected with said hub structure, an arm rigidly secured to said hub structure, a lever pivotally mounted on said arm, a device arranged adjacent to said lever and having a longitudinal guideway, a part carried by said lever and extending into said guideway, an operating member pivotally mounted on the free end of said lever, a second device having a longitudinal guideway arranged parallel with the first mentioned guideway, said operating member having a part extending into the last mentioned guideway, means to adjust the device having the last mentioned guideway to vary the position of said operating member with relation to its line of movement, said operating member having its center of gravity established at the axis of its connection with said lever, said lever having its center of gravity established at the axis of its connection with the arm carried by said hub structure and the center of gravity of said hub structure and the parts carried thereby, with the exception of said pendulum, being established at the axis of said hub structure.

24. In a scale, cooperating indicating members, an actuating device for one of said members having a part movable in a fixed path, a structure pivotally mounted on a fixed axis, a lever pivotally mounted on said structure, a device arranged adjacent to said lever and having a guideway, said lever having a part extending into said guideway, an operating member pivotally mounted on said lever at a point remote from its axis and arranged to act on said part of said actuating device, a second device having a guideway arranged parallel with the first mentioned guideway, said operating member having a part extending into the guideway of said last mentioned device, means for adjusting said last mentioned device to vary the position of said operating member with relation to said guideways, and a load actuated member operatively connected with said pivoted structure.

25. In a scale, cooperating indicating members, an actuating device for one of said members having a part movable in a fixed path, a structure pivotally mounted on a fixed axis, a lever pivotally mounted on said structure, a device arranged adjacent to said lever and having a guideway, said lever having a part extending into said guideway, an operating member pivotally mounted on said lever, at a point remote from its axis and arranged to act on said part of said actuating device, a second device having a guideway arranged parallel with the first mentioned guideway, said operating member having a part extending into the guideway of said last mentioned device, a load actuated member operatively connected with said pivoted structure, and a movable unit receptacle operatively connected with the device having the last mentioned guideway to adjust said guideway with relation to the first mentioned guideway and thereby vary the position of said operating member with relation to said guideways.

26. In a scale, cooperating indicating members, an actuating device for one of said indicating members, a device having a guideway, said actuating device having a part extending into said guideway, a second device having a guideway extending transversely to the first mentioned guideway, an operating member arranged to act on said actuating device, a part connected with said operating member and extending into the said second guideway, means for adjusting the position of said operating member with relation to said second guideway, and load controlled means for moving said operating member along said second guideway.

27. In a scale, cooperating indicating members, an actuating device for one of said indicating members, a device having a guideway, said actuating device having a part extending into said guideway, a second device having a guideway extending transversely to the first mentioned guideway, an elongated operating member arranged to act on said actuating device, a part connected with said operating member and extending into said second guideway, a third device having a guideway extending parallel with the second guideway, said operating member also having a part extending into said third guideway, means for adjusting said third device to vary the position of said operating member with relation to its line of movement, and means for moving said operating member along said guideways.

28. In a scale, cooperating indicating members, a device having a guideway, an actuating device for one of said indicating members having a part guided by said guideway, a structure pivotally mounted on a fixed axis, a lever connecting said structure with said part of said actuating device, a second device having a guideway extending transversely to the first mentioned guideway, an operating member arranged to act on said part of said actuating device, a part connected with said operating member and extending into said second guideway, a second structure pivotally mounted on a fixed axis, a lever connecting said second structure with said operating member, means for adjusting said operating member with relation to said second guideway, and a load actuated member operatively connected with said second pivoted structure.

29. In a scale, cooperating indicating members, a device having a guideway, an actuating device for one of said indicating members having a part guided by said guideway, a structure pivotally mounted on a fixed axis, a lever connecting said structure with said part of said actuating device, a second device having a guideway extending transversely to the first mentioned guideway, an operating member arranged to act on said part of said actuating device, a part connected with said operating member and extending into said second guideway, a second structure pivotally mounted on a fixed axis, a lever pivotally mounted on said second pivoted structure and having its free end pivotally connected with said operating member adjacent to said second guideway, a third device having a guideway extending parallel to said second guideway and said operating member having a part extending into said third guideway, means for adjusting said third device to vary the position of said operating member with relation to said second and third guideways, a load actuated member operatively connected with said second pivoted structure, said part of said actuating device and said operating member having their centers of gravity established at the axes of their connections with the respective levers, the centers of gravity of said levers and the parts carried thereby being established at the axes of said levers, and the centers of gravity of said pivoted structures and the parts carried thereby being established at the respective axes thereof, and a pendulum connected with said second pivoted structure to control the movement thereof independently of the weight of the parts carried thereby.

30. In a scale, cooperating indicating members, an actuating device for one of said indicating members, a device having a guideway, a projection carried by said actuating device and extending into said guideway, a second device having a guideway extending transversely to the first mentioned guideway, an operating member having a slot, a projection carried by said actuating device and extending into the slot of said operating member, a part connected with said operating member and extending into said second guideway, load controlled means for moving said operating member along said second guideway to cause it to act upon said actuating device with a cam action, and means for adjusting the angular position of said operating member with relation to said second guideway.

31. In a scale, cooperating indicating members, an actuating device for one of said indicating members, a device having a guideway, a projection carried by said actuating device and extending into said guideway, a second device having a guideway extending transversely to the first mentioned guideway, an operating member having a slot, a projection carried by said actuating device and extending into the slot of said operating member, a part connected with said operating device and extending into said second guideway, load controlled means for moving said operating member along said second guideway to cause it to act upon said actuating member with a cam action, a third device having a guideway extending parallel to said second guideway, said operating member having a part extending into said third guideway, and means for adjusting said third device to vary the angular position of said operating member with relation to said guideways.

32. In a scale, cooperating indicating members, an actuating device for one of said members having a part movable in a fixed path, an operating member arranged to engage said part of said actuating device with a cam action, means to guide one end of said operating member in a fixed path, load controlled means to move said operating member along said path, other means to guide the other end of said operating member in a fixed path parallel with the path of the first mentioned end of the operating member, and means for adjusting said last mentioned guiding means to vary the position of said operating member with relation to its path of movement.

33. In a scale, cooperating indicating members, an actuating device for one of said members having a part movable in a fixed path, an operating member arranged to engage said part of said actuating device with a cam action, means to guide one end of said operating member in a fixed path, load controlled means to move said operating member along said path, other means to guide the other end of said operating member in a fixed path parallel with the path of the first mentioned end of the operating member, and means actuated according to a unit of computation for adjusting said last mentioned guiding means to vary the position of said operating member with relation to its path of movement.

34. In a scale, cooperating indicating members, an actuating device for one of said members having a part movable in a fixed path, an operating member arranged to engage said part of said actuating device with a cam action, means to guide one end of said operating member in a fixed path, load controlled means to move said operating member along said path, other means to guide the other end of said operating member in a fixed path parallel with the path of the first mentioned end of the operating member, and manually operated means and unit operated means each operable to adjust the last mentioned guiding means to vary the position of said operating member with relation to its path of movement, one of said adjusting means being so arranged that when in its idle position the other adjusting means may be operated independently thereof.

35. In a scale, cooperating indicating members, an actuating device for one of said members having a part movable in a fixed path, an operating member arranged to engage said part of said actuating device with a cam action, means to guide one end of said operating member in a fixed path, load controlled means to move said operating member along said path, other means to guide the other end of said operating member in a fixed path parallel with the path of the first mentioned end of the operating member, a movable unit receptacle and an operative connection between said unit receptacle and the last mentioned guiding means whereby a unit on said unit receptacle will adjust the position of said operating member with relation to its path of movement according to the weight of said unit.

36. In a scale, cooperating indicating members, an actuating device for one of said members having a part movable in a fixed path, an operating member arranged to engage said part of said actuating device with a cam action, means to guide one end of said operating member in a fixed path, load controlled means to move said operating member along said path, other means to guide the other end of said operating member in a fixed path parallel with the path of the first mentioned end of the operating member, a movable unit receptacle, an operative connection between said unit receptacle and the last mentioned guiding means whereby a unit on said unit receptacle will adjust the position of said operating member with relation to its path of movement according to the weight of said unit, and manually operated means for adjusting said last mentioned guiding means to vary the position of said operating member, said manually operated means being of such a character that said guiding means may be adjusted by said unit receptacle independently thereof.

37. In a scale, cooperating indicating members, an actuating device for one of said members having a part movable in a fixed path, an operating member arranged to engage said part of said actuating device with a cam action, means to guide one end of said operating member in a fixed path, load controlled means to move said operating member along said path, other means to guide the other end of said operating member in a fixed path parallel with the path of the first mentioned end of the operating member, a structure pivotally mounted on a fixed axis, a lever pivotally mounted on said structure and operatively connected with the last mentioned guiding means, and a movable unit receptacle operatively connected with said pivoted structure.

38. In a scale, cooperating indicating members, an actuating device for one of said indicating members having a part movable in a fixed path, an operating member arranged to act on said part of said actuating device with a cam action, means to guide one end of said operating member in a fixed path, load controlled means to move said operating member along said path, a bar having a longitudinal guideway, a part carried by the other end of said operating member and extending into said guideway, a structure pivotally mounted on a fixed axis, a lever pivotally mounted on said structure, a part pivotally mounted on the free end of said lever and rigidly secured to the bar having said guideway, means to guide said part in a fixed path, and a movable unit receptacle operatively connected with said pivoted structure.

39. In a scale, cooperating indicating members, an actuating device for one of said indicating members having a part movable in a fixed path, an operating member arranged to act on said part of said actuating device with a cam action, means to guide one end of said operating member in a fixed path, load controlled means to move said operating member along said path, a bar having a longitudinal guideway, a part carried by the other end of said operating member and extending into said guideway, a structure pivotally mounted on a fixed axis, a lever pivotally mounted on said structure, a part pivotally mounted on the free end of said lever and rigidly secured to the bar having said guideway, said part having an arm extending at an angle to said guideway, and means acting on the outer end of said arm to cause the same to travel in a fixed path with relation to said guideway.

40. In a scale, cooperating indicating members, an actuating device for one of said indicating members having a part movable in a fixed path, an operating member arranged to act on said part of said actuating device with a cam action, means to guide one end of said operating member in a fixed path, load controlled means to move said operating member along said path, a bar having a longitudinal guideway, a part carried by the other end of said operating member and extending into said guideway, a structure pivotally mounted on a fixed axis, a lever pivotally mounted on said structure, a part pivotally mounted on the free end of said lever and rigidly secured to the bar having said guideway, said part having an arm extending at an angle to said guideway, a device arranged adjacent to said part and having a guideway extending transversely to the guideway of said bar, said lever and said arm of said part having projections extending into the last mentioned guideway, and a movable unit receptacle operatively connected with said pivoted structure.

41. In a scale, cooperating indicating members, an actuating device for one of said indicating members having a part movable in a fixed path, an operating member arranged to act on said part of said actuating device with a cam action, means to guide one end of said operating member in a fixed path, load controlled means to move said operating member along said path, a bar having a longitudinal guideway, a part carried by the other end of said operating member and extending into said guideway, a structure pivotally mounted on a fixed axis, a lever pivotally mounted on said structure, a part pivotally mounted on the free end of said lever and rigidly secured to the bar having said guideway, means to guide said part in a fixed path, a movable unit receptacle operatively connected with said pivoted structure, and a manually operated device arranged to engage said lever and impart movement to the bar having said guideway independently of said unit receptacle.

42. In a scale, cooperating indicating members, an actuating device for one of said indicating members having a part movable in a fixed path, an operating member movable in a fixed path and arranged to engage said part of said actuating device with a cam action, load controlled means for imparting operative movement to said operating member, guiding means for said operating member comprising a member which is adjustable to vary the position of said operating member with relation to its path, and a manually operated device to impart movement to said adjustable member.

43. In a scale, cooperating indicating members, an actuating device for one of said indicating members having a part movable in a fixed path, an operating member movable in a fixed path and arranged to engage said part of said actuating device with a cam action, load controlled means for imparting operative movement to said operating member, guiding means for said operating member comprising a member which is adjustable to vary the position of said operating member with relation to its path, a lever pivotally supported at one end and having its other end arranged to act upon said adjustable member, and a manually operated cam for imparting movement to said lever.

44. In a scale, cooperating indicating members, an actuating device for one of said indicating members having a part movable in a fixed path, an operating member movable in a fixed path and arranged to engage said part of said actuating device with a cam action, load controlled means for imparting operative movement to said operating member, guiding means for said operating member comprising a member which is adjustable to vary the position of said operating member with relation to its path, a lever pivotally mounted at one end and having its other end arranged to act on said adjustable member, a second lever rigidly connected with the first mentioned lever, and a manually operable cam arranged to act on said second lever.

45. In a scale, cooperating indicating members, an actuating device for one of said indicating members having a part movable in a fixed path, an operating member movable in a fixed path and arranged to engage said part of said actuating device with a cam action, load controlled means for imparting operative movement to said operating member, guiding means for said operating member comprising a member which is adjustable to vary the position of said operating member with relation to its path, a manually operated device arranged to act on said adjustable member, a movable unit receptacle, and means controlled by said unit receptacle, to act on said adjustable member independently of said manually operated means.

46. In a scale, cooperating indicating members, an actuating device for one of said indicating members having a part movable in a fixed path, an operating member movable in a fixed path and arranged to engage said part of said actuating device with a cam action, load controlled means for imparting operative movement to said operating member, guiding means for said operating member comprising a member which is adjustable to vary the position of said operating member with relation to its path, a structure pivotally mounted on a fixed axis, a lever pivotally mounted on said structure and connected with said adjustable member, a movable unit receptacle operatively connected with said pivoted structure, and a manually operated device arranged to engage said lever to actuate said adjustable member independently of said unit receptacle.

47. In a scale, cooperating indicating members, an actuating device for one of said indicating members, means for neutralizing the dead weight of said actuating device, an operating member for said actuating device, said operating member being capable of two movements, one of said movements being adapted to impart operative movement to said actuating device and the other of said movements being adapted to vary the amount of movement imparted to said actuating device by the first mentioned movement of said operating member, load controlled means for imparting operative movement to said operating member, means actuated according to the unit of computation to impart the second movement to said actuating member, and means to indicate the weight of the load carried by said load controlled means simultaneously with the operative movement of said operating member.

48. In a scale, cooperating indicating members, an actuating device for one of said members having a part movable in a fixed path, an operating member arranged to engage said part of said actuating device with a cam action, pivoted structure connected with said operating member to impart operative movement thereto, means to cause said operating member to travel in a fixed path, a load actuated member, an operative connection between said load actuated member and said pivoted structure, means to adjust said operating member with relation to its line of movement, an indicating member connected with said structure, and a weight chart cooperating with the last mentioned indicating member.

49. In a scale, an indicating member, load controlled means to actuate said indicating member, a movable unit receptacle, and means controlled by said unit receptacle to control the rate of movement of said indicating member relative to the movement of said load controlled means.

50. In a scale, a load actuated member, a movable unit receptacle, an indicating member, means operated by said load actuated member to actuate said indicating member, and means controlled by said unit receptacle to control the rate of movement of said indicating member relative to the movement of said load actuated member.

51. In a scale, a rotatable chart having a circumferentially arranged series of graduations on the face thereof, a fixed indicating member to cooperate with said graduations, a load actuated member, means controlled by said load actuated member to impart rotatory movement to said chart, a movable unit receptacle, and means controlled by said unit receptacle to control the rate of movement of said chart relative to the movement of said load actuated member.

52. In a scale, an indicating member, a load actuated member, means controlled by said load actuated member to actuate said indicating member, a movable unit receptacle, means controlled by said unit receptacle to control the rate of movement of said indicating member relative to the movement of said load actuated member, and means operable simultaneously with said indicating member to indicate the weight of the load on said load actuated member.

53. In a scale, a load actuated member, a movable unit receptacle, an indicating member, means actuated by said load actuated member to operate said indicating member, means controlled by said unit receptacle to control the rate of movement of said indicating member relative to said load actuated member, and means other than said unit receptacle to control said rate of movement.

54. In a scale, an indicating member, an adjustable operating device having means for operatively connecting the same with said indicating member, load controlled means comprising a pivoted member to impart operative movement to said operating device, means to position said operating device according to a unit of computation to control the rate of movement of said indicating device with relation to the movement of said load controlled mechanism, and means for counterbalancing said pivoted member to neutralize the dead weight of said operating device.

55. In a scale, a rotatable indicating member having a circumferential series of graduations on the face thereof, an adjustable operating device having means for operatively connecting the same with said indicating member to impart rotatory movement thereto, load controlled means comprising a pivoted member to impart operative movement to said operating device, means to position said operating device according to a unit of computation to control the rate of movement of said indicating member with relation to the movement of said load controlled means, and means for counterbalancing said pivoted member to neutralize the dead weight of said operating device.

56. In a scale, an indicating member, an adjustable operating device having means for operatively connecting the same with said indicating member, load controlled means comprising a pivoted member to impart operative movement to said operating device, means to position said operating device according to a unit of computation to control the rate of movement of said indicating member with relation to the movement of said load controlled mechanism, means for counterbalancing said pivoted member to neutralize the dead weight of said operating device, and means to indicate the weight of said load.

In testimony whereof, I affix my signature hereto.

WILLIAM R. MITTENDORF.